United States Patent
Ali et al.

(10) Patent No.: US 8,532,425 B2
(45) Date of Patent: Sep. 10, 2013

(54) METHOD AND APPARATUS FOR GENERATING A DENSE DEPTH MAP USING AN ADAPTIVE JOINT BILATERAL FILTER

(75) Inventors: Gazi Ali, Santa Clara, CA (US);
Kensuke Miyagi, Sunnyvale, CA (US);
Florian Ciurea, San Jose, CA (US);
Nobuyuki Matsushita, Tokyo (JP);
Hideki Nabesako, Tokyo (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 12/931,293

(22) Filed: Jan. 28, 2011

(65) Prior Publication Data

US 2012/0195492 A1     Aug. 2, 2012

(51) Int. Cl.
*G06K 9/40*     (2006.01)

(52) U.S. Cl.
USPC .......... 382/260; 382/274; 382/275; 358/3.26; 358/3.27

(58) Field of Classification Search
USPC ................. 382/260, 274, 275, 282
See application file for complete search history.

(56) References Cited

U.S. PATENT DOCUMENTS

| | | | | |
|---|---|---|---|---|
| 6,750,974 B2* | 6/2004 | Svetkoff et al. | ............... | 356/602 |
| 7,139,434 B2* | 11/2006 | Schwartz | ............... | 382/233 |
| 7,146,059 B1 | 12/2006 | Durand et al. | | |
| 7,321,695 B2* | 1/2008 | Schwartz | ............... | 382/239 |
| 7,382,925 B2* | 6/2008 | Boliek et al. | ............... | 382/233 |
| 7,394,530 B2* | 7/2008 | Budd | ............... | 356/237.1 |
| 7,426,312 B2 | 9/2008 | Dance et al. | | |
| 7,599,569 B2 | 10/2009 | Smirnov et al. | | |
| 7,889,949 B2* | 2/2011 | Cohen et al. | ............... | 382/299 |
| 7,945,111 B2* | 5/2011 | Ishiga | ............... | 382/263 |
| 8,081,836 B2* | 12/2011 | Porikli | ............... | 382/261 |
| 8,138,888 B2* | 3/2012 | Mukherjee | ............... | 340/5.82 |
| 8,180,168 B2* | 5/2012 | Bergman et al. | ............... | 382/260 |
| 2008/0267494 A1 | 10/2008 | Cohen et al. | | |
| 2008/0267530 A1 | 10/2008 | Lim | | |
| 2009/0161953 A1 | 6/2009 | Ciurea et al. | | |
| 2009/0220169 A1 | 9/2009 | Bennett et al. | | |

FOREIGN PATENT DOCUMENTS

| WO | WO 2010/029476 A1 | 3/2010 |
|---|---|---|
| WO | WO 2010/003625 A1 | 4/2010 |

OTHER PUBLICATIONS

"A Fast Approximation of the Bilateral Filter using a Signal Processing Approach", Sylvain Paris and Frédo Durand, International Journal of Computer Vision; vol. 81, No. 1/Jan. 2009; 39 pages.
"Edge-Preserving Decompositions for Multi-Scale Tone and Detail Manipulation"; Zeev Farbman, Faanan Fattal; Dani Lischinski and Richard Szeliski, 10 pages, no date.

* cited by examiner

*Primary Examiner* — Yosef Kassa
(74) *Attorney, Agent, or Firm* — Moser Taboada

(57) ABSTRACT

A method and apparatus for generating a dense depth map. In one embodiment, the method includes applying a joint bilateral filter to a first depth map to generate a second depth map, where at least one filter weight of the joint bilateral filter is adapted based upon content of an image represented by the first depth map, and the second depth map has a higher resolution than the first depth map.

16 Claims, 9 Drawing Sheets

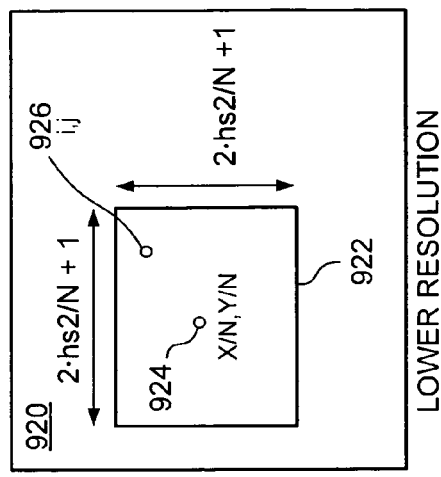
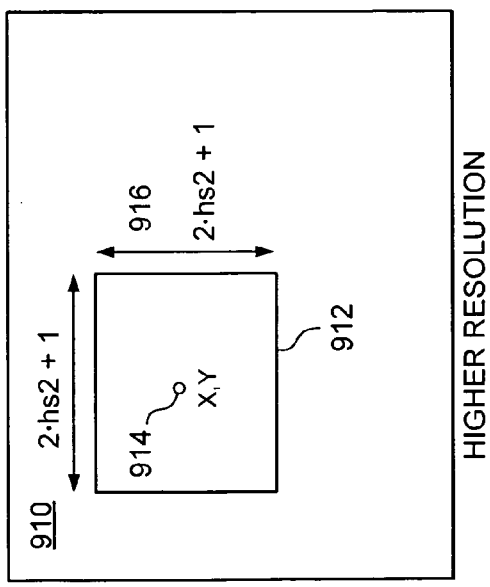
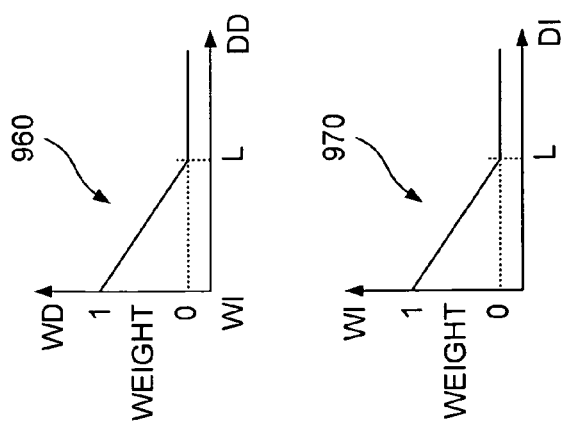
FIG. 9

METHOD AND APPARATUS FOR GENERATING A DENSE DEPTH MAP USING AN ADAPTIVE JOINT BILATERAL FILTER

BACKGROUND

1. Field of the Invention

Embodiments of the present invention generally relate to depth map generation and, more particularly, to a method and apparatus for generating a dense depth map using an adaptive, joint bilateral filter.

2. Description of the Related Art

Generally bilateral filters are used in image processing to provide edge-preserving smoothing of an image. Bilateral filters provide both domain and range filtering of images to smooth image content, yet maintain the edges of objects within the image. However, since bilateral filtering involves updating pixel values by estimating a weighted sum of pixel values over a large neighborhood of pixels, such filtering requires substantial computational resources and long periods of time to complete the calculations.

Further, a depth map represents depth in an image relative to a given focal plane. The focal plane is typically located upon the main subject of the image, but the plane (i.e., a reference plane when arbitrarily chosen) can be located at any arbitrary position within a scene. The depth map then represents object distance relative to the plane as a positive or negative value, with the magnitude of the value representing distance from the plane and the sign representing whether the object is in front of or behind the reference plane. Depth maps are typically created using ranging techniques such as laser or ultrasonic range finders as well as imaging techniques such as parallax processing. Depth maps may be enhanced using joint bilateral filtering. The goal of joint bilateral filtering is to both remove anomalous depth values through smoothing of depth values in flat areas and to improve the spatial resolution and depth resolution of the depth map. Generally bilateral filtering is slow and existing methods to optimize the processing utilize significant additional memory, or utilize approximations that may produce erroneous results.

Some image processing techniques utilize depth maps to enhance the image processing results. For example, depth maps are useful in foreground/background decomposition, face recognition, object tracking and the like. The depth map provides depth information that can be used to decompose an image into constituent components related to their depth within the image. However, using a low resolution depth map for image processing results in significant loss of quality and accuracy in the processing.

Accordingly, there exists a need for a method and apparatus for efficiently generating a dense depth map.

SUMMARY OF THE INVENTION

Embodiments generally include a method and apparatus for generating a dense depth map. In one embodiment, the method includes applying a joint bilateral filter to a first depth map to generate a second depth map, where at least one filter weight of the joint bilateral filter is adapted based upon content of an image represented by the first depth map, and wherein the second depth map has a higher resolution than the first depth map.

Notations $DL_{i,j}$: depth value of pixel with coordinates (i, j) in lower resolution depth map $DH_{X,Y}$: depth value of pixel with coordinates (X, Y) in higher resolution depth map X, Y: coordinates of current pixel in higher resolution depth map i, j: coordinates of pixel in refinement window in lower resolution depth map $IH_{X,Y}$: intensity of pixel current pixel (X, Y) from higher resolution image $IL_{i,j}$: intensity of pixel (i, j) from lower resolution image $WD_{X,Y,i,j}$: weight based on distance between pixel (X,Y) and pixel (i, j)

$DD_{X,Y,i,j}$: distance term between pixel (X, Y) and pixel (i, j)

$DI_{X,Y,i,j}$: difference term for intensity difference between pixel (X, Y) and pixel (i, j)

$WI_{X,Y,i,j}$: weight based on intensity difference between pixel (X, Y) and pixel (i, j)

$L_{X,Y,i,j}$: intensity difference between pixel (X,Y) and pixel (i, j)

M: resizing factor for first refinement method

N: resizing factor for second refinement method

P: resizing factor that brings image into resolution of depth map hs1: half size of refinement window for first refinement method hs2: half size of refinement window for second refinement method

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 is a functional block diagram representing sub-sampled images used in a second refinement method according to an embodiment.

DETAILED DESCRIPTION

Figure 1:
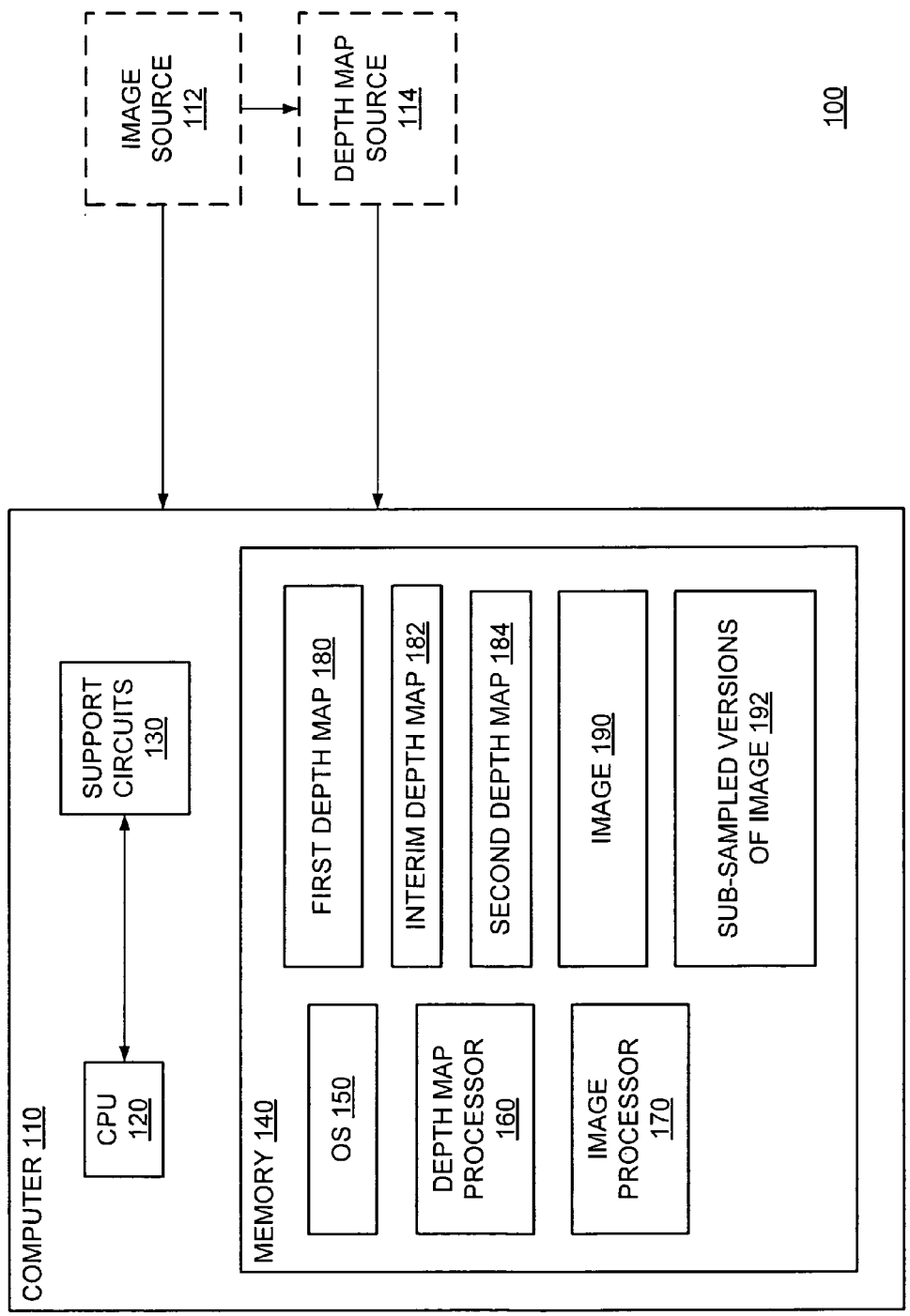
FIG. 1 is a block diagram of a system for generating a dense depth map using an adaptive bilateral filter according to one or more embodiments.

FIG. 1 is a block diagram of a system 100 for generating a dense depth map using an adaptive bilateral filter according to one or more embodiments. The system 100 includes a computer 110 and an image source 112 and a depth map source 114. The computer 110 includes central processing unit (CPU) 120, support circuits 130 and a memory 140. The CPU 120 may comprise one or more commercially available microprocessors or microcontrollers that facilitate data processing and storage. Various support circuits 130 facilitate operation of the CPU 120 and may include clock circuits, buses, power supplies, input/output circuits and/or the like. The memory 140 includes a Read Only Memory, Random Access Memory, disk drive storage, optical storage, removable storage, and the like. The memory 140 includes an operating system 150, a depth map processor 160, image processor 170, an interim depth map 182, a first depth map 180, a second depth map 184, an image 190 and sub-sampled versions of the image 192.

The computer 110 communicates with the image source 112 and the depth map source 114 to obtain an image 190 and a first depth map 180, respectively. The image source 112 is a device that captures images, e.g., a digital camera, video camera, and the like. The depth map source 114 is a device or circuit that generates the first depth map 180 associated with the image 190. The depth map source 114 may be a depth sensor circuit such as a laser or ultrasonic ranging circuit. In other embodiments, the source 114 may be a circuit that computes depth from two or more images using parallax processing. Other software and/or hardware based techniques for depth map generation may be used.

The first depth map 180 obtained from the depth map source 114 and the image 190 obtained from the image source 112, are stored in the memory 140. The depth map processor 160 is implemented by, for example, a depth map refinement method 200 with reference to FIG. 2. The depth map processor 160 generates an interim depth map 182 and a dense depth map 184 (also referred to herein as a second depth map). The first depth map 180 is refined by the depth map processor 160 by implementing, for example, the depth map refinement method 200, to generate depth maps of successively higher resolution, the interim depth map 182 followed by the second depth map 184.

The first depth map 180 is a low resolution depth map that, for example, represents depth in the image 190 relative to a focal plane. In other embodiments, the depth map may be represented in terms of absolute depth and an arbitrary plane may be considered as a reference plane. In the current implementation, the focal plane is typically located upon the main subject of the image 190. However, the focal plane may be arbitrarily positioned. All pixel locations representing an object or surface behind the focal plane are allocated a polarity or sign (e.g., negative) and a value representing the distance from the focal plane. All pixel locations representing an object in front of the focal plane are allocated a polarity (e.g., positive) and a value representing the distance from the focal plane.

The image processor 170 generates the sub-sampled versions of image 192. The image processor 170 encodes the image 190 by implementing sub-sampling to generate low resolution sub-sampled versions of image 192. Those skilled in the art will appreciate that sub-sampling may be implemented by various well known sub-sampling techniques such as block-based pixel averaging, among others. The sub-sampled versions of the image 192 include sub-sampled images of varying resolution (not shown in FIG. 1), such as a sub-sampled image 192a of, for example, a high resolution 1/P, a sub-sampled image 192b of, for example, a medium resolution of 1/PN and a sub-sampled image 192c of, for example low resolution 1/PMN (where M, N and P are integer values). In one embodiment of the invention, the sub-sampled images are used to guide (adapt) the refinement process used to create a dense depth map from the first (input) depth map. More specifically, the sub-sampled images are used to adapt a bilateral filter that is used to refine the low resolution depth map to form a dense depth map.

As an example M=4, N=2, P=8 such that the high resolution corresponds to 1/4th resolution of the input image, medium resolution corresponds to 1/16th resolution of the input image, and low resolution corresponds to 1/64th resolution of the input image.

Figure 2:
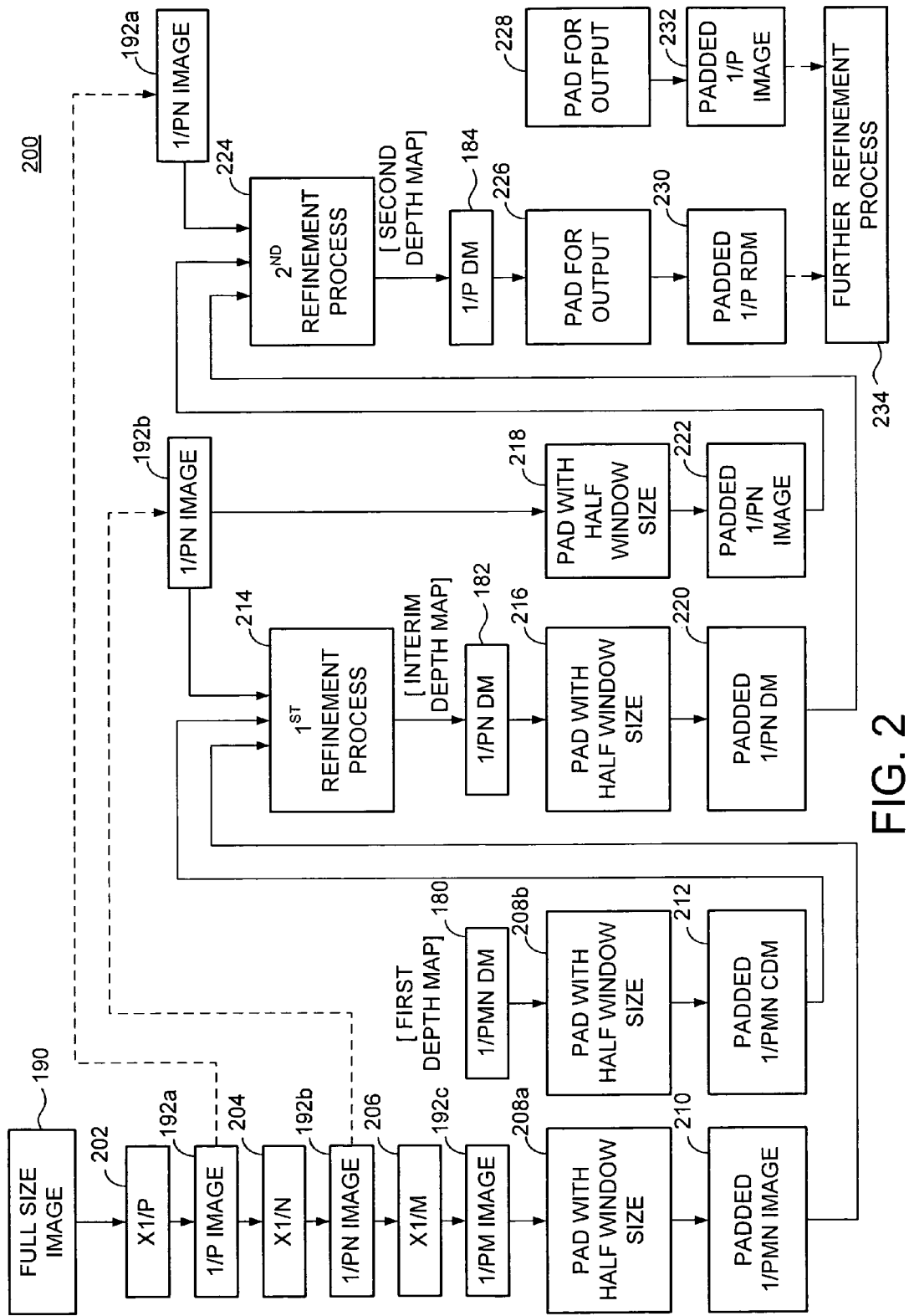
FIG. 2 is a functional block diagram representing a depth map refinement method according to one embodiment.

FIG. 2 is a block diagram representing a depth map refinement method 200 according to one embodiment. The input to the depth map refinement method 200 is a full resolution image 190 and the first depth map 180. In the example illustrated in FIG. 2, the full size image 190 is subsampled at step 202 by 1/P to form a first sub-sampled image 192a (1/P image). The first sub-sampled image 192a is subsampled at step 204 by 1/N to form a second subsampled image 192b (1/PN image). The second subsampled image 192b is sub-sampled at step 206 by 1/M to form a third subsampled image 192c (1/PMN image). The lowest resolution subsampled image 192c has a resolution that matches the low resolution of the first depth map 180. Those skilled in the art will appreciate that the resolution of the sub-sampled image 192c is commensurate with the resolution of the depth map being refined using the depth refinement method 200.

At blocks 208a and 208b, the sub-sampled image 192c and the first depth map 180 are padded, as needed, with pixels to create images of equal number of pixels. For example, since the sub-sampled image 192c and the first depth map 180 have the same resolution of 1/PMN, both the sub-sampled image 192c and the first depth map 180 are padded with a number of pixels and depth map values, respectively, proximate the image and depth map boundaries such that the size of each image measured in pixels and depth map values is the same. In some embodiments, padding may not be necessary. The padded sub-sampled image 210 and the second subsampled image 192b are used to refine the padded first depth map 212 by a first refinement process 214. The first refinement process at step 204 is described in detail below with reference to FIG. 4. The first refinement process 204 produces an interim depth map 182 that has a higher resolution than the first depth map 180. The resolution of the interim depth map 182 is, for example, 1/PN, i.e., the same resolution as the second sub-sampled image 192b.

At step 216, the interim depth map 182 is padded, as needed, and at step 218 the second sub-sampled image 192b is padded to generate an image with the same number of pixels as depth map values are contained in the interim depth map 182. The padded depth map 220 and padded image 222 are coupled to a second refinement step 224. At the second refinement step 224, the padded image 222 and the first sub-sampled image 192a are used to refine the padded interim depth map 220. The second refinement process 224 is described in detail below with reference to FIG. 7. The second refinement process 224 produces a second depth map 184. The second depth map 184 has a depth map value density that is higher than both the first depth map 180 and the interim depth map 182 i.e., a resolution equal to the resolution of the first subsampled image 192a. If necessary, the second depth map 184 and the first subsampled image 192a may be respectively padded at steps 226 and 228 to respectively form padded depth map 230 and padded image 232.

Although, only two refinement steps are shown in the embodiment illustrated in FIG. 2, the depth refinement method 200 may be extended by any number of additional refinement steps, as indicated by the further refinement process 234. Further refinement process 234 involves repeating the second refinement step for each additional desired refinement. The repetition process may involve additional adaptive parameter tuning and/or resolution change.

Figure 3:
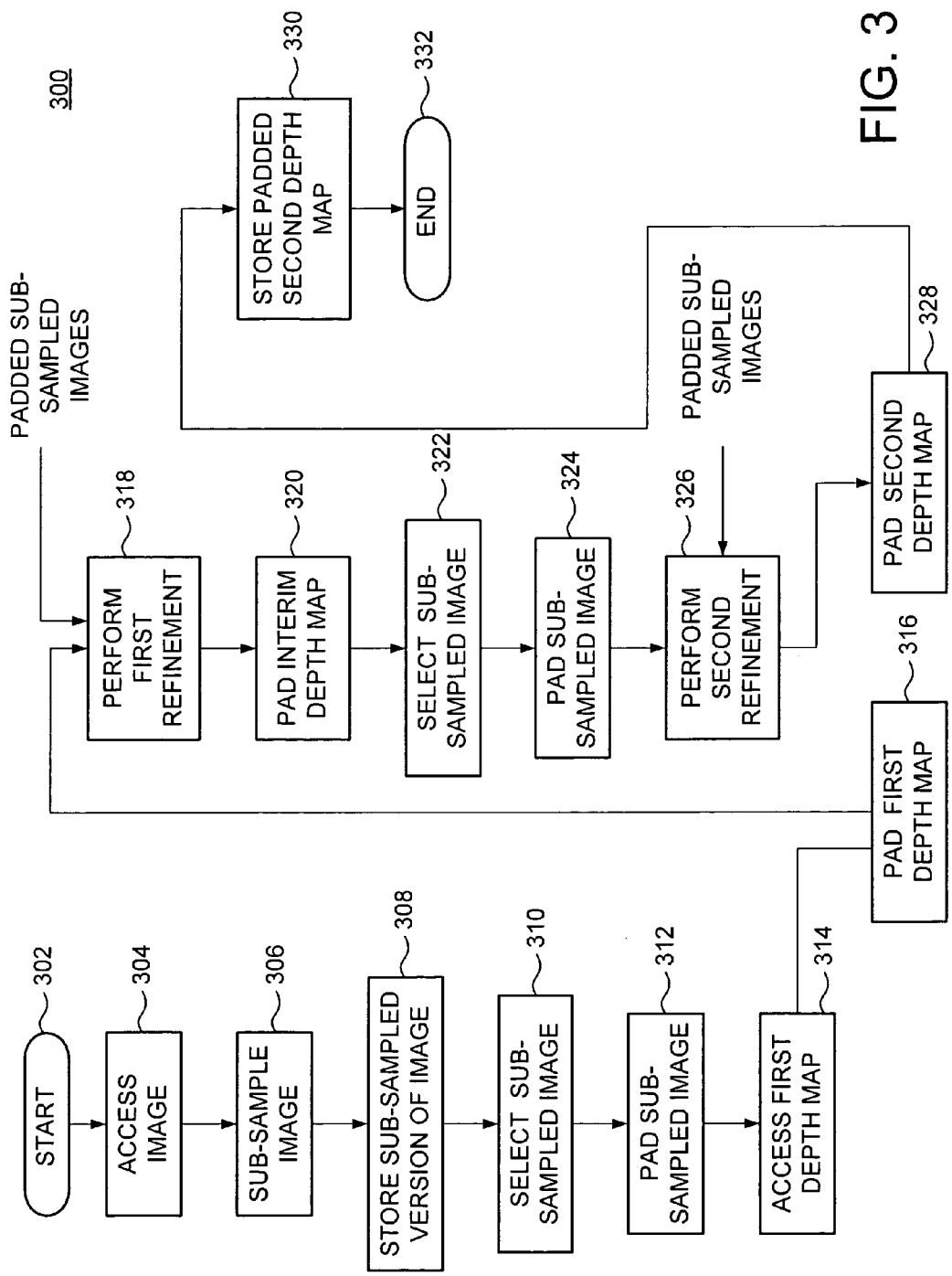
FIG. 3 is a flow diagram illustrating a method for processing a depth map to generate a dense depth map according to one embodiment.

FIG. 3 is a flow diagram illustrating a method 300 for processing a depth map to generate a dense depth map according to one embodiment. The method 300 begins at step 302 and proceeds to step 304. At step 304, an image (for example, the image 190 of FIG. 1) is accessed from memory (or delivered from the image source). At step 306, the image is sub-sampled to generate sub-sampled versions of the image (for example, the sub-sampled versions of the image 192 of FIG. 1). At step 308, the sub-sampled versions of the image are stored in the memory. At step 310, an appropriate sub-sampled image is selected from the sub-sampled versions. According to some embodiments, the sub-sampled image is selected according to the resolution of the depth map to be refined. For example, the third sub-sampled image 192c and the second subsampled image 192b are selected to refine the first depth map (for example, the depth map 180 of FIG. 1) with a resolution of 1/PMN. At step 312, the selected third sub-sample image 192c may be padded, as needed.

At step 314, the first depth map 180 is accessed from memory, or otherwise provided by the depth map source. At step 316, the first depth map 180 may be padded, as needed, to generate a padded first depth map. At step 318, the first refinement method similar to, for example, the first refinement at step 214 of FIG. 2 is performed. The first refinement method is described in detail below with reference to FIG. 4. At step 320, the interim depth map (for example, the interim depth map 182 of FIG. 1) generated by the first refinement method may be padded, as needed. At step 322, other appropriate sub-sampled images (image 192b and 192a) are selected from the sub-sampled versions of the image. The sub-sampled images are selected at step 322 according to the resolution of the interim depth map. For example, the sub-sampled image 192a with a resolution of 1/P is selected to guide refinement of the interim depth map 182. At step 324, the selected sub-sampled image 192b may be padded, as needed.

At step 326, the second refinement method (for example, the second refinement at step 224 of FIG. 2) is performed. The second refinement method is described in detail below with reference to FIG. 7. At step 328, the second depth map (for example, the second depth map 184 of FIG. 1) generated by the second refinement method may be padded, as needed. At step 330, the padded second depth map is stored for further processing and the method 300 ends at step 332.

Figure 4:
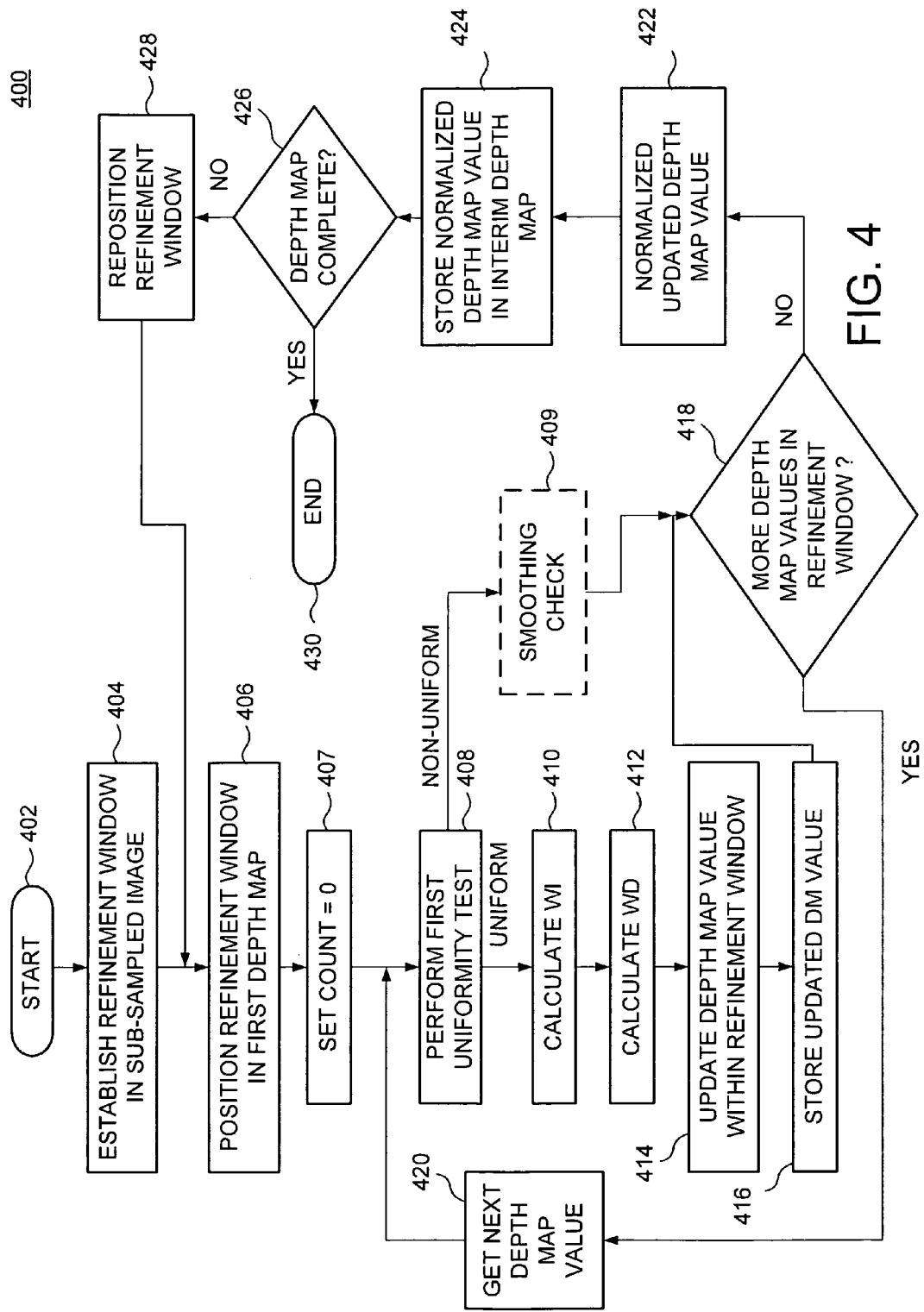
FIG. 4 is a flow diagram illustrating a first refinement method according to one embodiment.

FIG. 4 is a flow diagram illustrating a first refinement method 400 implementing step 326 of FIG. 3 according to one embodiment. The first refinement method 400 begins at step 402 and proceeds to step 404. At step 404, a refinement window is established in the sub-sampled image (for example, the third sub-sampled image 192c and second sub-sampled image 192b of FIG. 2). At step 404, a corresponding refinement window (a bilateral filtering window) is positioned in the first depth map (for example, the first depth map 180). At step 403, a counter is set to zero. This counter value is used in a second uniformity test described below. At step 406, a first uniformity test is optionally performed. The first uniformity test may be performed to determine whether the refinement window within the depth map contains a uniform set of a depth map values or not. The method of the first uniformity test is described below with reference to FIG. 5. If the method 400 deems the window content to be uniform, the method 400 proceeds to step 410. If the window content is deemed non-uniform, the method 400 proceeds to step 418 (or optionally step 409) without updating a depth map value.

The optional smoothing check and a method of implementation are described in detail below.

At step 410, an intensity weight WI for the bilateral filter is calculated and at step 412 a distance weight WD for the bilateral filter is calculated. As such, the intensity weight WI and the distance weight WD are computed using a refinement window established in the sub-sampled image. The method of computation of WI and WD is described in detail below with reference to FIG. 6. However, those skilled in the art will appreciate that computing WI and WD using the sub-sampled image having a low resolution reduces the computation time and cost, since the number of pixels to be processed is smaller in the low resolution sub-sampled image. Through step 406 to 422, depth map value at the center of the refinement window is computed using the bilateral filter equation (more general version is given by equation 1). At step 416, the updated depth map value is temporarily stored. As each depth map value in the window is processed, the stored value of the center located value is updated.

At step 418, a determination is made whether there are more depth map values in the refinement window to be processed. If there are more depth map values in the refinement window (option "YES"), the next depth map value is obtained at step 420 and the method 400 returns and repeats steps from 408 to 416. In this embodiment, the window size is ±hs1 (±hs2 for second refinement method) locations away from the center value. In this manner, the depth map values within the window are weighted and summed to provide a new value for a denser depth map. If there are no more depth map values in the refinement window (option "NO"), the method 400 proceeds to step 422.

At this point (option "NO"), the value stored in 416 is given by the term:

$$\sum_{i=X/M-hs1}^{X/M+hs1} \sum_{j=Y/M-hs1}^{Y/M+hs1} (DL_{i,j} \times WI_{X,Y,i,j} \times WD_{X,Y,i,j}) \quad (1)$$

At step 422, updated depth map value from 416 is normalized using the equation:

$$DH_{X,Y} = \frac{\sum_{i=X/M-hs1}^{X/M+hs1} \sum_{j=Y/M-hs1}^{Y/M+hs1} (DL_{i,j} \times WI_{X,Y,i,j} \times WD_{X,Y,i,j})}{\sum_{i=X/M-hs1}^{X/M+hs1} \sum_{j=Y/M-hs1}^{Y/M+hs1} (WI_{X,Y,i,j} \times WD_{X,Y,i,j})} \quad (2)$$

At step 424, the normalized depth map values are stored as values of the interim depth map.

At step 426, a determination is made whether the first depth map is complete or not. If the first depth map is not complete (option "NO"), the method 400 proceeds to step 428. At step 428, the refinement window is repositioned in the first depth map and the next center located value is computed. In one embodiment, the method 400 shifts the window a predefined distance and proceeds to compute the next new depth map value. The predefined distance determines the pixel density of the interim depth map. For example, if the predefined distance is ½ the distance between depth map values of the first depth map, the resolution will be increased by a factor of two. If the first depth map is complete (option "YES"), the method 400 proceeds to end at step 430.

Figure 5:
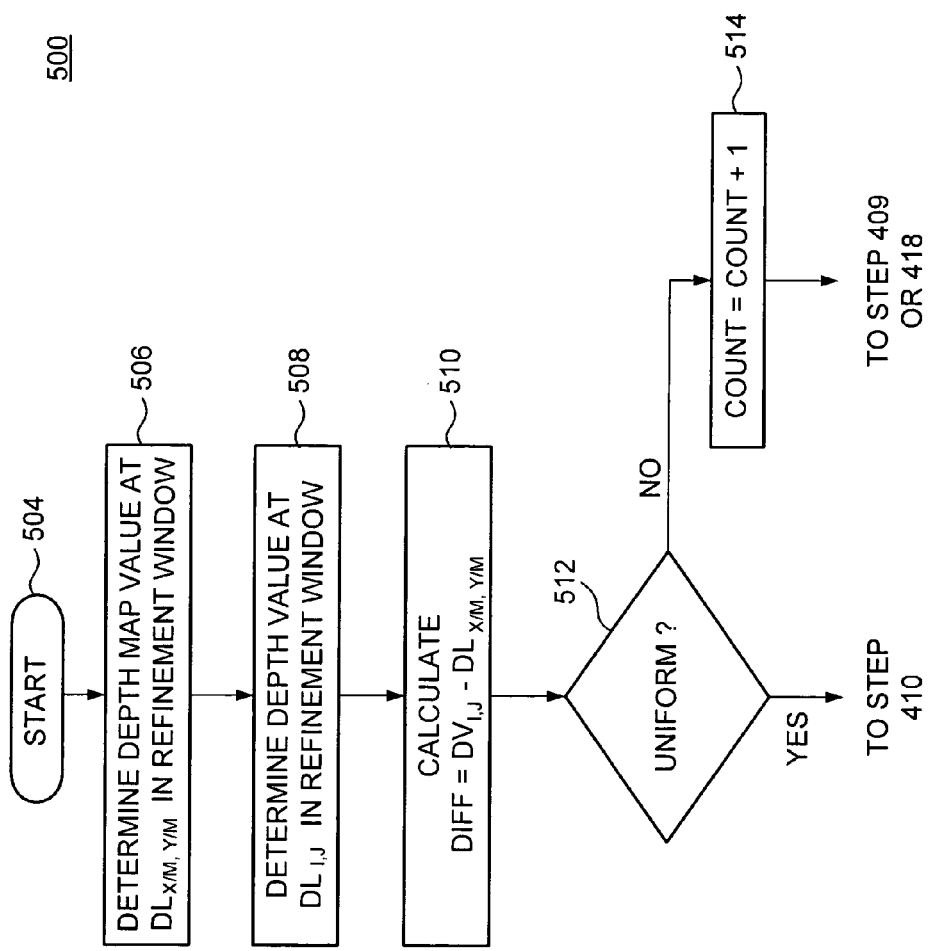
FIG. 5 is a flow diagram illustrating a method for a first uniformity test according to an embodiment.

FIG. 5 is flow diagram illustrating a method 500 for performing a first uniformity test (step 408 of FIG. 4) according to an embodiment. As described above, the first uniformity test is used to determine the uniformity of the depth map values within the refinement window. As such, a depth map includes pixels having depth map values that are either positive or negative to indicate the distance in front of or behind a focal plane, respectively. The uniformity of the depth map values within the refinement window is determined by comparing the depth values $DL_{i,j}$ within the refinement window to the depth value at the center $DL_{X/M, Y/M}$ of the refinement window. Locations with depth map values significantly different from the depth map value of the central location are excluded from the first refinement method and thereby do not contribute to the bilateral filtering process applied to the depth map. The method 500 of the first uniformity test is described in detail in the following paragraphs.

The method 500 starts at step 504 and proceeds to step 506. At step 506, the depth map value for the central location $DL_{X/M, Y/M}$ of the refinement window is determined. The co-ordinates of the central pixel at low resolution are represented as X/M, Y/M. The central location is described here in FIG. 6 only as an example, and not as a limitation, of a reference location for the uniformity test being performed for the refinement window. Any location within the refinement window may be used as the reference location.

At step 508, the depth map value of a location with co-ordinates $DL_{i,j}$ is determined, where (i,j) are co-ordinates of a current location within the refinement window other than the central location. At step 510, the method 500 calculates the difference DIFF between $DL_{X,Y}$ and the $DL_{i,j}$.

The value |DIFF| is used in the uniformity test of step 512. In step 512, a determination is made whether |DIFF| is higher than a predetermined uniformity threshold "threshold_UT" and whether the sign of $DL_{i,j}$ is opposite to that of $DL_{X/M,Y/M}$. If |DIFF| is less than "threshold_UT" or the sign of $DL_{i,j}$ is not opposite to that of $DL_{X/M,Y/M}$ (option "NO"), the method 500 deems the value at the current location to be uniform and returns to method 400 at step 410 in FIG. 4. If value of |DIFF| is higher than threshold_UT and the sign of $DL_{i,j}$ is opposite to that of $DL_{X/M,Y/M}$ (option "YES"), the region is deemed to be non-uniform and the method 500 proceeds to step 514 where the value COUNT is incremented by 1 and stored in memory (e.g., a register). The method 500 then returns to either step 409 or 418 of FIG. 4. A depth map value with a large difference with respect to the center value represents a boundary within the depth map. Using such a discontinuity within the window may cause an anomalous filter result. As such, the depth map value is excluded from the computation of Equation (1).

As is described below, the value count being generated in the first uniformity test is accessed and used in the second refinement method (for example the second refinement method 326 of FIG. 3). This count represents the number of depth map values within the window that are both non-uniform and have an opposite sign to the center value, i.e., representing a depth boundary within the window.

Figure 6:
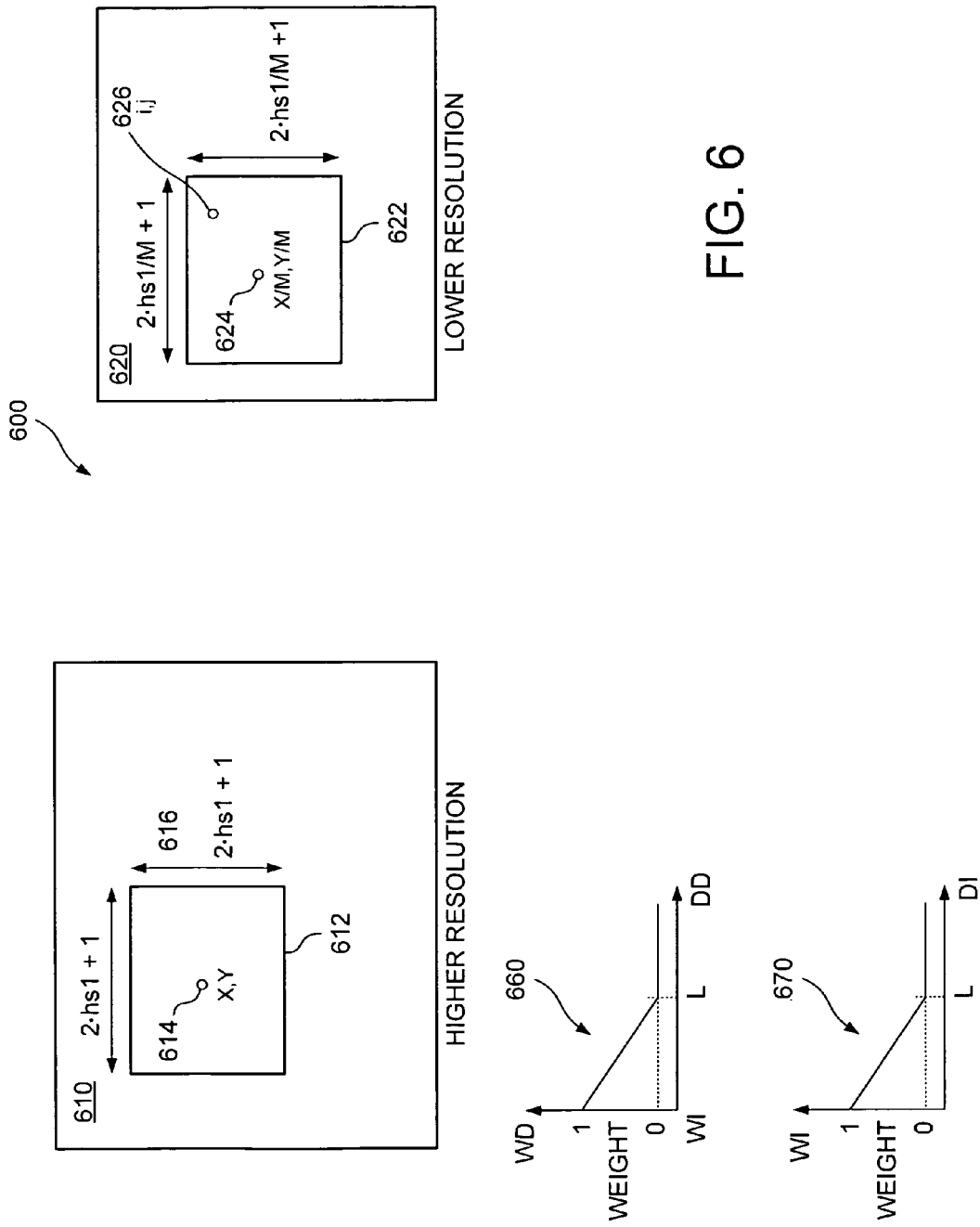
FIG. 6 is a functional block diagram representing sub-sampled images used in the first refinement method according to an embodiment.

FIG. 6 is a schematic representation of sub-sampled images 620 and 610. The sub-sampled image 620 has a relatively lower resolution than the resolution of image 610. For example, the sub-sampled image 620 is similar to, for example, the sub-sampled image 192c and the sub-sampled image 610 is similar to, for example the sub-sampled image 192b. In one embodiment, the subsampled image 620 has a resolution of 58×42 and the subsampled image 610 has a resolution of 232×171.

A refinement window 622 of a size (2*hs1/M+1)×(2*hs1/M+1) pixels is established in the sub-sampled image 620, which has a similar effect as having aa refinement window 612 of a size (2*hs1+1)×(2*hs1+1) in the target resolution image 610. M is the resolution ratio of 2 sub-sampled images 620 to 610. For example, if hs1 is 8 and M is 4, just by having 5×5 window in the lower resolution image 620, the method can cover an area of 17×17 in the higher resolution image 610. As such, the intensity weight $WI_{X,Y,i,j}$ of the bilateral filter is calculated using the sub-sampled image 620 and the refinement window 622.

Although the foregoing description utilizes a resizing factor M (as well as N and P for other subsampled images) that is equal for both the x-axis and the y-axis, in other embodiments, the resizing factor may be different for each axis, e.g., subsampling at $M_x$, $M_y$, $N_x$, $N_y$, $P_x$, and $P_y$.

In the case when the image 620 is given in Y, Cr, Cb format (luminance, blue/yellow, red/green), the intensity difference can be computed across all three channels as given in following equation:

$$DI_{X,Y,i,j} = w_Y \times |IHY_{X,Y} - ILY_{i,j}| + \qquad (3)$$
$$w_{Cb} \times |IHCb_{X,Y} - ILCb_{i,j}| + w_{Cr} \times |IHCr_{X,Y} - ILCr_{i,j}|$$

$w_Y$, $w_{Cb}$, and $w_{Cr}$ are weight coefficients of Y, Cb, and Cr, respectively. In other embodiments the image can be converted to another luminance/chrominance space such as L*a*b* and the distance can be computed in such a space using the known ΔE perceptual difference or a similar distance metric.

If the image is in a grayscale format, the above equation becomes:

$$DI_{X,Y,i,j} |IH_{X,Y} - IL_{i,j}| \qquad (4)$$

$DI_{X,Y,i,j}$ can be computed on the fly or the computation can be implemented via a lookup table, similarly to $WI_{X,Y,i,j}$ in graph 670, to find the level weight $WI_{X,Y,i,j}$ to use in the refinement window 612 for the first refinement method. The $WI_{X,Y,i,j}$ table contents forms one dimension of the filter function applied to the depth values in the window 612. In one embodiment, the function is linear (as shown). In other embodiments, the function is non-linear depending upon the desired filter effect. Also, if the uniformity tests of FIG. 5 has indicated that uniformity is broken, $WI_{X,Y,i,j}$ is set to zero, and $WI_{X,Y,i,j}$ value does not need to be computed for that depth map location.

Further, as described above with reference to FIG. 2, a sub-sampled image of resolution corresponding to the resolution of the interim depth map, for example, the sub-sampled image 192b, is input to the first refinement method. The distance weight WD is, for example, calculated using the sub-sampled image 192b. $DD_{X,Y,i,j}$ is computed using the following equation:

$$DD_{X,Y,i,j} = \left|X - \left\{M\left(\left\lfloor\frac{X}{M}\right\rfloor + i\right) + \gamma\right\}\right| + \left|Y - \left\{M\left(\left\lfloor\frac{Y}{M}\right\rfloor + j\right) + \gamma\right\}\right|; \qquad (5)$$

γ=correction value for shifting the center at higher resolution

Other distances such as Euclidean distance can also be used for calculating $DD_{X,Y,i,j}$.

$DD_{X,Y,i,j}$ is computed as a sum of the absolute value of a horizontal distance from the central pixel 614 (with co-ordinates X,Y) to a corresponding pixel in the target resolution of the each pixel 626 (with co-ordinates i,j) in a refinement window The term γ which may be $$\left\lceil \frac{M}{2} \right\rceil \text{ or } \left\lfloor \frac{M}{2} \right\rfloor$$

depending on the indexing method used in the implementation. γ is used to compensate for shift in indices due to sub-sampling between higher resolution and lower resolution: (X, Y) are coordinates in higher resolution while (i, j) are coordinates in lower resolution.

$WD_{X,Y,i,j}$ can be pre-computed from $DD_{X,Y,i,j}$ the means of a lookup table or computed using a mathematical formula, such as that represented by a $WD_{X,Y,i,j}$ graph 660, to find the distance weight $WD_{X,Y,i,j}$ to use for the first refinement method. Although a linear relationship between distance and/or level and the filter weight is illustrated in FIG. 6, other relationships according to the requirement of the filtering process may be utilized. Although $WD_{X,Y,i,j}$ is described here, as being calculated using the sub-sampled image 192b, both filter weights, $WD_{X,Y,i,j}$ and $WI_{X,Y,i,j}$, could be calculated using very low resolution sub-sampled image such as the sub-sampled image 192a to further reduce the computational cost of bilateral filtering.

As per the foregoing description, the first refinement method computes filter weights for a first bilateral filter that is applied to the first depth map using a low resolution image to guide (adapt) the weight computation. In addition, a uniformity test is performed to exclude certain depth values from the computation, where the values are deemed to represent a boundary within a depth map. The results is a interim depth map having a higher resolution than the first depth map as well as having smooth content yet maintain the boundaries of the depth map.

Figure 7:
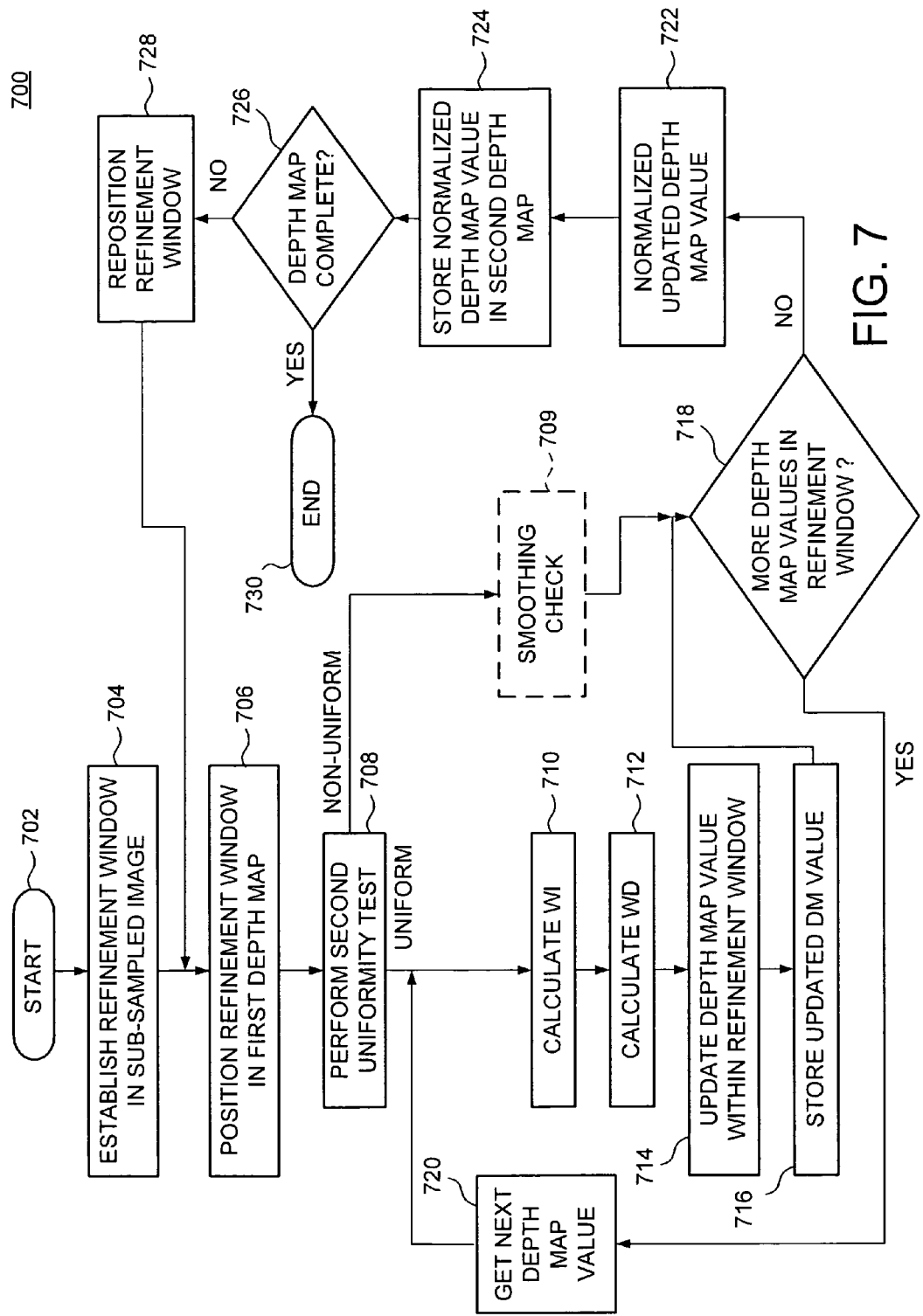
FIG. 7 is a flow diagram illustrating a second refinement method according to one embodiment.

FIG. 7 is a flow diagram illustrating a second refinement method 700 implementing step 326 of FIG. 3 according to one embodiment. The second refinement method 700 begins at step 702 and proceeds to step 704. At step 704, a refinement window is established in the sub-sampled image (for example, the padded sub-sampled image 222 of FIG. 2) and he padded interim depth map (for example, 220 of FIG. 2). At step 708, a second uniformity test is performed. The method of the second uniformity test is described below with, for example, a method 800 with reference to FIG. 8. If the region is deemed non-uniform, the method 700 the method proceeds from step 708 to step 718 (or, optional smoothing check step 709). Embodiments of implementations of the smoothing check of step 709 are described in detail below. If the region is deemed uniform at step 708, the method 700 proceeds from step 708 to step 710.

At step 710, an intensity weight $WI_{X,Y,i,j}$ of a second bilateral filter is calculated and at step 712 a distance weight $WD_{X,Y,i,j}$ of a second bilateral filter is calculated. As such, the $WI_{X,Y,i,j}$ and the $WD_{X,Y,i,j}$ are computed using refinement window established in the sub-sampled image. The method of computation of $WD_{X,Y,i,j}$ and the $WD_{X,Y,i,j}$ is described in detail below with reference to FIG. 9. Through steps 706 to 722, a depth map value at the center of the refinement window is computed using the bilateral filter equation (please see equation 1).

At step 716, the center depth map value $DH_{X,Y}$ is temporarily stored. As each depth map value in the window is processed, the stored value of the center located value is updated. At step 718, a determination is made whether there are more depth map values in the refinement window that have yet to be used to contribute to the computed center depth map value. If there are more depth map values in the refinement window (option "YES"), the next depth map value is obtained at step 720 and repeats step 710 to step 716. In this embodiment, the window size is ±hs2 values around the center pixel X,Y. In this manner, the depth map values within the window are weighed and summed to provide a new value for a denser depth map. If there are no more depth map values in the refinement window (option "NO"), the method 700 proceeds to step 722. At step 722, updated depth map values are normalized (please see equation 2). At step 724, the normalized depth map values are stored in a second depth map.

At step 726, a determination is made whether the second depth map is complete or not. If the depth map is not complete (option "NO"), the method 700 proceeds to step 728. At step 728, the refinement window is repositioned in the first depth map and the next center value is computed. In one embodiment, the method 700 shifts the window a predefined distance and proceeds to compute the next new depth map value. The predefined distance determines the pixel density of the second depth map. If the first depth map is complete (option "YES"), the method 700 proceeds to end at step 730. The result is a second depth map having a higher resolution, where the increased resolution is defined by the predefined distance.

Figure 8:
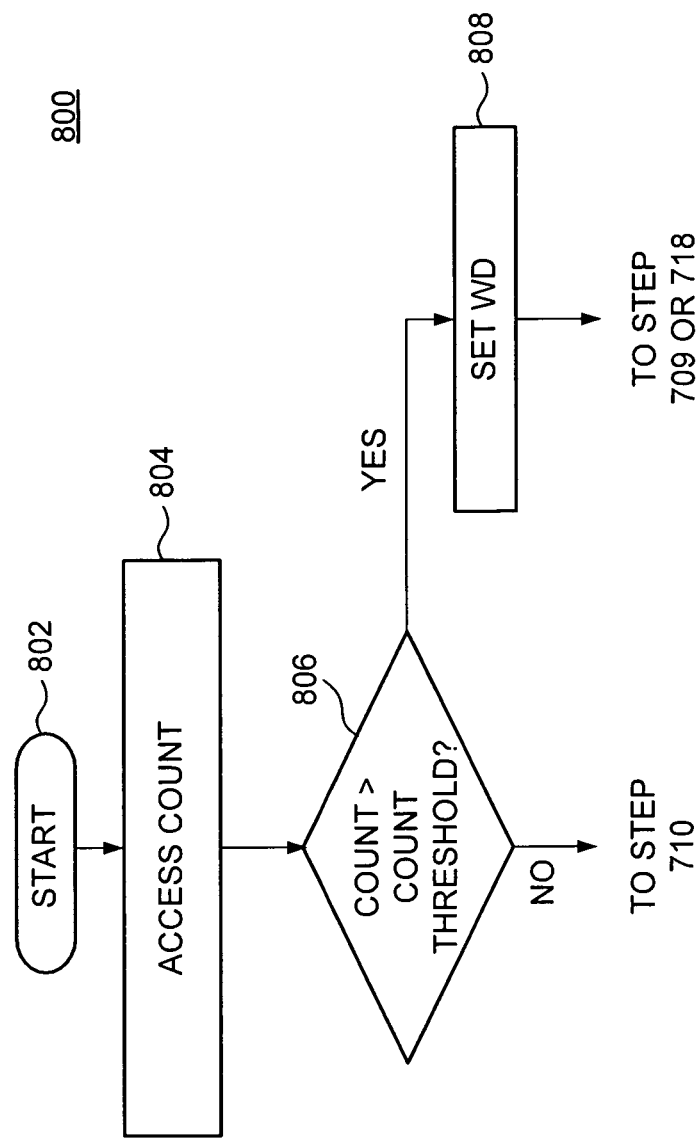
FIG. 8 is a flow diagram illustrating a method for a second uniformity test according to an embodiment.

FIG. 8 is a flow diagram illustrating a method 800 implementing a second uniformity test (step 708 of FIG. 7) according to an embodiment. The second uniformity test excludes a depth map value from the second refinement step according to the count generated in the first uniformity test. The method 800 starts at step 802 and proceeds to step 804. At step 804, the method 800 accesses the count generated by the first uniformity test (for example, uniformity test method 408 at step 518). The count generated in the first uniformity test provides the number of depth map values within the refinement window that are excluded from the first refinement step and do not belong to same side of a focal plane. At step 806, a determination is made whether the count for the depth map value being processed within the refinement window exceeds a predetermined count threshold. In one embodiment, the count threshold is 30% of total number of depth values in the $2^{nd}$ refinement window size (2*hs2+1)×(2*hs2+1). If the count exceeds the predetermined count threshold (option "YES"), the method 800 moves to step 808, at which the distance weight $WD_{X,Y,i,j}$ for the depth map value presently being processed is set to a fixed value for a sharper filter (i.e., the value $WD_{X,Y,i,j}$ is multiplied by a constant H, where H>1). Setting $WD_{X,Y,i,j}$ to a value greater than one, defines a sharper weight than would be otherwise be used by the bilateral filter. In an embodiment, the $WD_{X,Y,i,j}$ is set to four to define a distance weight four times sharper than is otherwise defined for "normal" bilateral filtering. After setting WD, the method 800 returns to method 700 at step 709 or step 718 in FIG. 7. If the count does not exceed the predetermined count threshold (option "NO"), the method 800 returns to method 700 at step 710 of FIG. 7. In this manner, the second refinement ensures the depth map values are generated using a sharp filter (less smoothing) when the value is near a boundary.

FIG. 9 is schematic representation of 2 sub-sampled images 920 and 910 (sub-sampled image 192a of FIG. 2) used in a second refinement method (for example, the second refinement method 700 of FIG. 7.) The sub-sampled image 920 has a similar resolution as the padded interim depth map 220, which is also an input to the second refinement process, and the sub-sampled image 910 has a similar resolution as the target depth map resolution of the second refinement process.

A refinement window 922 of size (2*hs2/N+1)×(2*hs2/N+1) pixels is established in the sub-sampled image 920. A (2*hs2/N+1)×(2*hs2/N+1) refinement window in the lower resolution depth map is equivalent to a (2×hs2+1)×(2×hs2+1)

window in a higher resolution depth map. M is resolution ratio between the lower resolution image 920 and the higher resolution image 910. For example, if hs2 is 8 and N is 2, just by having 9×9 pixel refinement window on the lower resolution image we can cover about 17×17 area in the high resolution image, which reduces the amount of computations. As such, the intensity weight WI of the bilateral filter is calculated using the sub-sampled image 920 and the refinement window 922.

In the case in which the image 620 is given in Y, Cr, Cb format (luminance, blue/yellow, red/green), the intensity difference can be computed across all three channels as given in following equation:

$$DI_{X,Y,i,j} = w_Y \times |IHY_{X,Y} - ILY_{i,j}| + \qquad (6)$$

$$w_{Cb} \times |IHCb_{X,Y} - ILCb_{i,j}| + w_{Cr} \times |IHCr_{X,Y} - ILCr_{i,j}|$$

$w_Y$, $w_{Cb}$, and $w_{Cr}$ are weight coefficients of Y, Cb, and Cr, respectively. In other embodiments the image can be converted to another luminance/chrominance space such as L*a*b* and the distance can be computed in such a space using the known ΔE perceptual difference or a similar distance metric. If the image is in a grayscale format, the above equation becomes:

$$DI_{X,Y,i,j} = |IH_{X,Y} - IL_{i,j}| \qquad (7)$$

Computing WI based on DI can be done via a lookup table or computing formula to generate values, such as that represented by graph 970, to find the level weight WI to use in the refinement window 912,912 for the second refinement method. In one embodiment, the function is linear (as shown). In other embodiments the function is non-linear depending upon the desired filter effect.

Further, as described above with reference to FIG. 2, a sub-sampled image of resolution corresponding to the resolution of the interim depth map, the interim depth map, and a sub-sampled image of resolution corresponding to the target resolution of the second refinement process are input to the second refinement method. They image for example corresponds to 222, 220, and 192a of FIG. 2 respectively. The distance weight WD is for example, calculated using the sub-sampled image 192a. The size of the refinement window in the depth map 220 and the sub-sampled image 222 is same. $DD_{X,Y,i,j}$ is computed using the following equation:

$$DD_{X,Y,i,j} = \left|X - \left\{N\left(\left\lfloor\frac{X}{N}\right\rfloor + i\right) + \gamma_2\right\}\right| + \left|Y - \left\{N\left(\left\lfloor\frac{Y}{N}\right\rfloor + j\right) + \gamma_2\right\}\right| \qquad (8)$$

$\gamma_2$=correction value for shifting the center at higher resolution

Other distances such as Euclidean distance can also be used for calculating $DD_{X,Y,i,j}$.

The term DD is computed as a sum of the absolute value of a horizontal distance from the central pixel 914 with co-ordinates (X,Y) to a corresponding pixel in the target resolution of the each pixel 926 with coordinates (i,j) in a refinement window plus the absolute value of a vertical distance of these 2 positions. The term $\gamma_2$ may be $$\left\lceil\frac{N}{2}\right\rceil \text{ or } \left\lfloor\frac{N}{2}\right\rfloor$$

depending on the indexing method used in the implementation. $\gamma_2$ is used to compensate for shift in indices due to sub-sampling between higher resolution and lower resolution: (X,Y) are coordinates in higher resolution while (i,j) are coordinates in lower resolution.

The term DD is used in a lookup table or mathematical formula to generate values, such as how WD graph 960, to find the distance weight WD to use for the second refinement method. Although a linear relationship between DD distance and distance weight WD is illustrated in FIG. 9, other relationships according to the requirement of the filtering process may be utilized. Also, the sharpening factor from the second uniformity test is applied to WD accordingly.

Optional smoothing checks at steps 409 or 709 provide a smoothing check for a region deemed non-uniform by either the first or second uniformity tests. As alternative embodiments, two possible methods for smoothing are described; other smoothing techniques may be used. In a first smoothing method, if the edge strength around current pixel in the refined depth map exceeds a certain value and edge strength of the equivalent pixel in the image is below a certain threshold, the range filter (WI) is flattened by a predefined factor. Flattening of this range filter achieves the smoothing effect.

One way of estimating the edge strength is using gradient magnitude computed using finite central differences. Other methods for measuring edge strength are also possible.

$$EDGEDL_{X/M,Y/M} = $$
$$\sqrt{((DL_{X/M-1,Y/M} - DL_{X/M+1,Y/M})/2)^2 + ((DL_{X/M,Y/M-1} - DL_{X/M,Y/M+1})/2)^2}$$

$$EDGEIL_{X/M,Y/M} = $$
$$\sqrt{((IL_{X/M-1,Y/M} - IH_{X/M+1,Y/M})/2)^2 + ((IH_{X/M,Y/M-1} - IH_{X/M,Y/M+1})/2)^2}$$

First Smoothing Method:
  Compute $EDGEDL_{X/M,Y/M}$ (first refinement) or $EDGEDL_{X/N,Y/N}$ (second refinement)
  Compute $EDGEIL_{X/M,Y/M}$ (first refinement) or $EDGEIL_{X/N,Y/N}$ (second refinement)
  Apply smoothing:
    if $EDGEDL_{X/M,Y/M}$>threshold_edge_DL and $EDGEIL_{X/M,Y/M}$<threshold_edge_I
    flatten $WI_{X,Y,i,j}$
Example values for thresholds are
  threshold_edge_DL is set to approximately 10% of absolute of maximum depth;
  threshold_edge_I is set to approximately 20% of maximum intensity value.

In an alternative smoothing method, the edge strength is computed for the lower resolution depth map. Insufficiently strong edges in the original lower resolution depth map are determined by comparing with a threshold. For edges whose strength is determined to be smaller than a predefined threshold, smoothing is applied as defined in the first method. One way of estimating the edge strength is using gradient magnitude computed using finite central differences. Other methods for measuring edge strength are also possible.

Alternative Smoothing Method:
  Compute $EDGEDL_{X/M,Y/M}$ (first refinement) or $EDGEDL_{X/N,Y/N}$ (second refinement)

$$EDGEDL_{X/M,Y/M} = $$
$$\sqrt{((DL_{X/M-1,Y/M} - DL_{X/M+1,Y/M})/2)^2 + ((DL_{X/M,Y/M-1} - DL_{X/M,Y/M+1})/2)^2}$$

Apply smoothing
if $EDGEDL_{X/M,Y/M}$<threshold_edge_DL
Example values for threshold is
threshold_edge_DL is set to approximately 15% of absolute maximum depth The foregoing two smoothing methods are to be performed in the absence of a confidence measure in depth map and edge strength of the image.

In case confidence measures for the depth map as well for the image edge strength are available, a more general check for when to trigger smoothing condition (flattening $WI_{X,Y,i,j}$) can be formulated as following:

if $(CDL_{X/M,Y/M}$<threshold_CDL) or
$(CEDGEIL_{X/M,Y/M}$<threshold_CEDGE), flatten $WI_{X,Y,i,j}$ where:
$CDL_{X/M, Y/M}$: confidence measure of $DL_{X/M, Y/M}$ (low value indicates a low confidence in depth estimate)
$CEDGEIL_{X/M, Y/M}$: confidence measure of edge strength of $IL_{X/M, Y/M}$ (low value indicates a low confidence in edge strength estimate)
threshold_CDL: threshold for determining where depth map is confident or not threshold_CEDGE: threshold for determining where edge is confident or not The various embodiments described herein provide several advantages. For example, using sub-sampled images of lower resolution for calculating weights of the joint bilateral filter reduces the computational cost of applying joint bilateral filters to generate a dense depth map. Further, the uniformity test used for determining the uniformity of depth map values in the refinement window allows the joint bilateral filter to adapt the refinement process to the content of the image.

It is to be understood that other similar embodiments may be used. Modifications/additions may be made to the described embodiments for performing the same function of the present invention without deviating therefore. Therefore, the present invention should not be limited to any single embodiment, but rather construed in breadth and scope in accordance with the recitation of the appended claims.

The invention claimed is:

1. A computer implemented method for generating a dense depth map comprising:
applying a joint bilateral filter to a first depth map to generate a second depth map by:
performing a first refinement of the first depth map using the at least one first filter weight of the joint bilateral filter having been adapted based upon the content of the image, to generate an interim depth map, where the interim depth map has a higher resolution than the first depth map; and
performing a second refinement of the interim depth map using the at least one second filter weight of the joint bilateral filter having been adapted based upon the content of the image, to generate the second depth map,
wherein the content of the image is represented by a sub sampled version of the image and at least one filter weight of the bilateral filter is adapted based upon content of an image represented by the first depth map, and the second depth map has a higher resolution than the first depth map.

2. The method of claim 1, wherein performing the first refinement comprises:
positioning a refinement window in the first depth map;
performing a first uniformity test for each depth map value in the refinement window;
updating a depth map value for the interim depth map using the at least one first filter weight of the bilateral filter having been adapted based upon the content of the image; and
repositioning the refinement window within the first depth map, performing the first uniformity test and updating the depth map value of the interim depth map, wherein the refinement window is repositioned till the first depth map is complete.

3. The method of claim 2 further comprising applying a smoothing check to the refinement window upon the first uniformity test determining the refinement window to be non-uniform.

4. The method of claim 3 wherein said smoothing check comprises determining edge strength or confidence measures regarding depth map values within the refinement window.

5. The method of claim 3 wherein, if smoothing is deemed necessary, applying a flattening filter within the refinement window.

6. The method of claim 2, wherein performing the first uniformity test comprises:
excluding a depth map value from the first refinement step if the depth map value is significantly different from a reference depth map value of the refinement window; and
maintaining a count of the depth map values that are excluded and do not belong to same side of a focal plane in the refinement window.

7. The method of claim 6, wherein excluding a depth map value from the first refinement step comprises:
assigning a value of zero to the at least one first filter weight for the depth map value if the difference between the depth map value and the depth map value of the central pixel exceeds a predetermined uniformity threshold.

8. The method of claim 1, wherein performing the second refinement comprises:
positioning a refinement window in the interim depth map and subsampled image of a similar resolution as the interim depth map;
performing a second uniformity test for the refinement window;
updating depth map values within the refinement window using the at least one first filter weight of the bilateral filter having been adapted based upon the content of the image; and
repositioning the refinement window in the interim depth map, performing the second uniformity test and updating the depth map values within the refinement window, wherein the refinement window is repositioned till the second depth map is complete.

9. The method of claim 8, wherein performing the second uniformity test comprises:
excluding a depth map value from the second refinement step if the count of depth map values excluded from the first refinement step and not belonging to same side of a focal plane in the refinement window exceeds a predetermined count threshold.

10. The method of claim 9, wherein excluding a depth map value from the second refinement step comprises:
accessing the count; and
setting the at least one second filter weight to a predetermined value greater than one, if the count exceeds a predetermined count threshold.

11. The method of claim 9 further comprising applying a smoothing check to the refinement window upon the second uniformity test determining the refinement window to be non-uniform.

12. The method of claim 11 wherein said smoothing check comprises determining edge strength or confidence measures regarding depth map values within the refinement window.

13. The method of claim 11 wherein, if smoothing is deemed necessary, applying a flattening filter within the refinement window.

14. A non-transitory computer readable medium for storing software that, when executed by a computing system, causes a computing system to:
   apply a joint bilateral filter to a first depth map to generate a second depth map by:
   performing a first refinement of the first depth map using the at least one first filter weight of the bilateral filter having been adapted based upon the content of the image, to generate an interim depth map, where the interim depth map has a higher resolution than the first depth map; and
   performing a second refinement of the interim depth map using the at least one second filter weight of the bilateral filter having been adapted based upon the content of the image, to generate the second depth map,
   wherein at least one filter weight of the joint bilateral filter is adapted based upon content of an image represented by the first depth map and the second depth map has a higher resolution than the first depth map.

15. The computer readable medium of claim 14, wherein the first refinement comprises:
   positioning a refinement window in the first depth map;
   performing a first uniformity test for each depth map value in the refinement window;
   updating depth map values within the refinement window using the at least one first filter weight of the bilateral filter having been adapted based upon the content of the image; and
   repositioning the refinement window within the first depth map, performing the first uniformity test and updating the depth map values within the refinement window,
   wherein the refinement window is repositioned till the first depth map is complete.

16. The computer readable medium of claim 15, wherein the second refinement comprises:
   positioning a refinement window in the interim depth map;
   performing a second uniformity test for the refinement window;
   updating depth map values within the refinement window using the at least one first filter weight of the bilateral filter having been adapted based upon the content of the image; and
   repositioning the refinement window in the interim depth map, performing the second uniformity test and updating the depth map values within the refinement window,
   wherein the refinement window is repositioned till the interim depth map is complete.

* * * * *